A. C. JOHNSTON.
BRAKE FOR TROLLEY DRUMS AND THE LIKE.
APPLICATION FILED JUNE 29, 1914.
1,140,829.
Patented May 25, 1915.
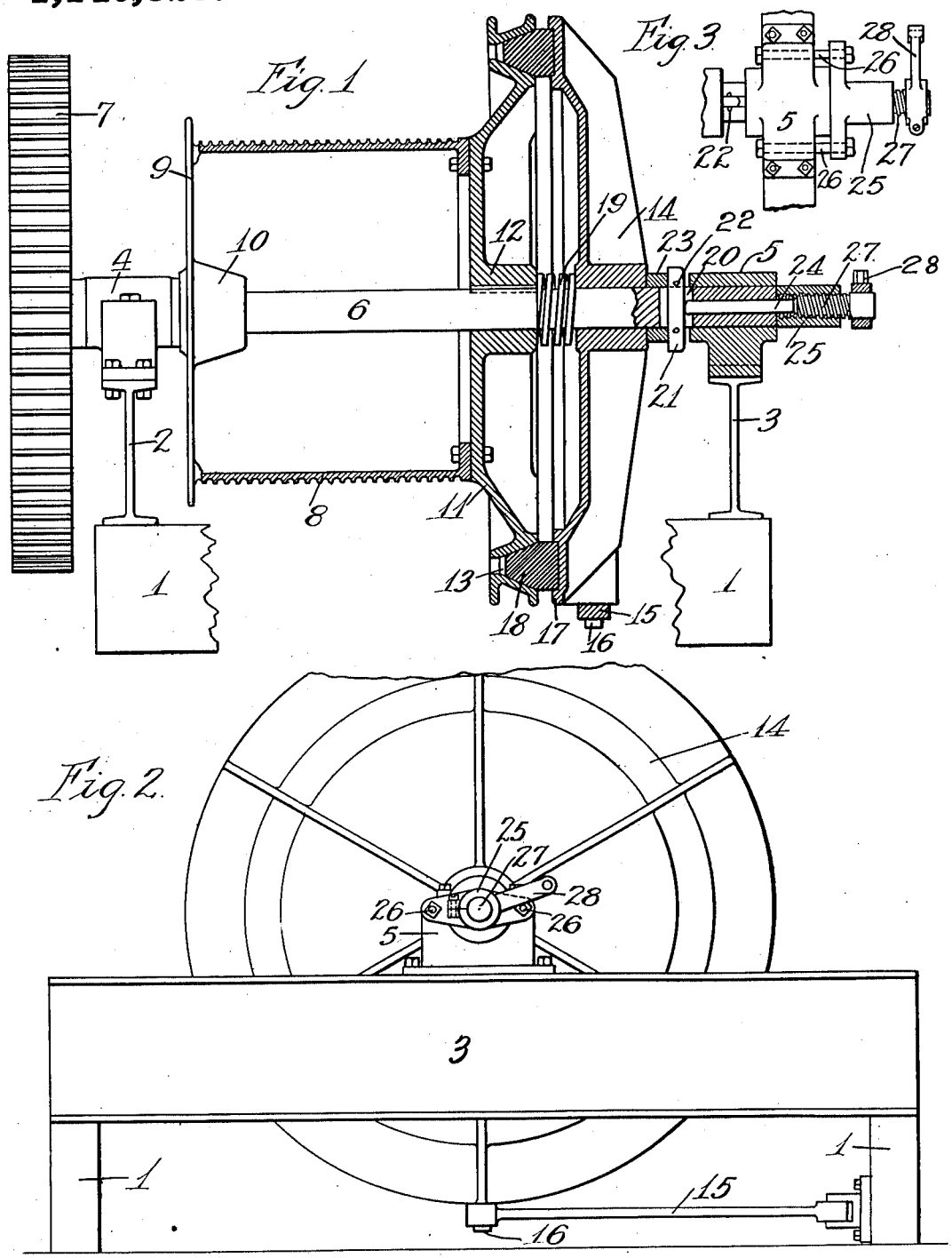

UNITED STATES PATENT OFFICE.

ARTHUR C. JOHNSTON, OF CHICAGO, ILLINOIS, ASSIGNOR TO LINK BELT COMPANY, OF CHICAGO, ILLINOIS, A CORPORATION OF ILLINOIS.

BRAKE FOR TROLLEY-DRUMS AND THE LIKE.

1,140,829.     Specification of Letters Patent.     Patented May 25, 1915.

Application filed June 29, 1914. Serial No. 847,845.

*To all whom it may concern:*

Be it known that I, ARTHUR C. JOHNSTON, a citizen of the United States, residing at Chicago, in the county of Cook and State of Illinois, have invented a certain new and useful Improvement in Brakes for Trolley-Drums and the like, of which the following is a specification.

My invention relates to improvements in trolley drums for hoisting, conveying and power transmitting mechanisms and has particular reference to a new and improved means for applying the braking or retarding force thereto.

It is illustrated in one form in the accompanying drawing, wherein—

Figure 1 is a side elevation in part section with parts broken away and parts omitted; Fig. 2 is an end elevation with parts cut away; Fig. 3 is a detailed plan view of the controlling end of the machine.

Like parts are indicated by like letters throughout the several figures.

1 is a main supporting frame or base carrying the two cross supporting I-beam members 2, 3. Upon these members are mounted respectively the bearing or pillow blocks 4, 5 in which is rotatable a shaft 6. The shaft 6 has on one end adjacent the pillow block a driving gear 7 driven by any suitable means not here shown. Between the two pillow blocks is located a winding drum 8 supported on one end of the spider 9 having a hub 10 and on the other end of the brake spider 11 having a hub 12, the hubs 10 and 12 being keyed to the shaft. The brake spider has arranged about its periphery a V-shaped groove 13.

14 is a brake wheel or spider rotatably mounted on the shaft 6 and held against rotation by the tie link 15 pivoted at one end to the frame 1 and at the other end to a lug 16.

17 is a brake ring having a truncated V-shaped part 18 to engage the V groove 13 on the spider 11.

19 is a spring interposed betwen the hub 12 and the spider 14 surrounding the shaft 6. The shaft 6 is slotted for a portion of its length adjacent the pillow block 5 as shown at 20. In this slot is a key 21 held in position by means of pins 22.

23 is a bearing or pressure collar interposed between the key 21 and the rear side of the spider 14.

24 is a pin or plunger slidable longitudinally with respect to the shaft 6 engaging at one end the center of the key 21.

25 is a nut fixed in position and held against the bearing or pillow block 5 by the tie bolts 26.

27 is a screw in threaded engagement with the nut 25 adapted to contact one end of the pin 24.

28 is a controlling lever for the screw 27 by manipulation of which the screw may be fed forward to force the clutch brake into engagement with the drum.

It will be evident that while I have shown in my drawing an operative device, still many changes might be made both in size, shape and arrangement of parts without departing materially from the spirit of my invention, and I wish therefore that my drawing be regarded as in a sense diagrammatic.

The use and operation of my invention are as follows: My device is coupled up to a hoisting or conveying system in which case the cable will wind over the drum. Power will be applied through the gear as indicated by any suitable means. The inertia of such a system is likely to be great and frequently is necessary to rapidly start or stop it. The friction of the moving parts is not sufficient to bring it to a rest with sufficient rapidity and starting braking means are needed. The operator, by means not here shown, manipulates the handle, feeding the screw into the nut, forces the pin forward pressing the key against the bearing ring on the outer side of the clutch spider and thus thrusts the clutch ring into the V-shape groove on the end of the drum. Since the clutch spider cannot rotate the frictional contact of the ring and groove will resist the rotational movement of the drum and bring it to rest. The pressure may be graduated conveniently and easily by manipulation of the screw and thus the device can be made to operate as rapidly or slowly as is necessary. Preferably, although it is not absolutely necessary, it would be best to have the screw of such pitch as to be not self-locked so that the resistance of the spring when the operator no longer manipulates the screw will be sufficient to unscrew it and release the clutch, though for some purposes it would be desirable to have it self-locking.

I claim:

The combination with a cable drum of a shaft upon which it is rigidly mounted, a wheel carried by and projecting from the drum and having a brake groove in the periphery thereof, a spider rotatably mounted on the shaft and free to travel therealong, a brake band carried thereby in opposition to the brake groove and means independent of said shaft pivotally connected to the spider for preventing rotation thereof.

In testimony whereof, I affix my signature in the presence of two witnesses this 26th day of June 1914.

ARTHUR C. JOHNSTON.

Witnesses:
MINNIE M. LINDENAU,
BESSIE S. RICE.